United States Patent
Cocea et al.

(10) Patent No.: US 12,499,217 B2
(45) Date of Patent: Dec. 16, 2025

(54) ANOMALOUS COMMAND LINE ENTRY DETECTION

(71) Applicant: CrowdStrike, Inc., Sunnyvale, CA (US)

(72) Inventors: Stefan-Bogdan Cocea, Bucharest (RO); Mihaela Petruta Garan, Bucharest (RO); Cristian Viorel Popa, Bucharest (RO); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 291 days.

(21) Appl. No.: 17/945,625

(22) Filed: Sep. 15, 2022

(65) Prior Publication Data

US 2024/0095346 A1    Mar. 21, 2024

(51) Int. Cl.
*G06F 21/55* (2013.01)
*G06F 18/214* (2023.01)
*G06N 20/00* (2019.01)

(52) U.S. Cl.
CPC .......... *G06F 21/552* (2013.01); *G06F 18/214* (2023.01); *G06F 21/554* (2013.01); *G06N 20/00* (2019.01)

(58) Field of Classification Search
CPC .... G06F 21/552; G06F 18/214; G06F 21/554; G06N 20/00
See application file for complete search history.

(56) References Cited

U.S. PATENT DOCUMENTS

| | | | | |
|---|---|---|---|---|
| 10,452,839 B1* | 10/2019 | Curtin | .................... | G06N 20/20 |
| 10,726,058 B2* | 7/2020 | Sparrow | ................ | G06N 3/084 |
| 10,762,165 B2* | 9/2020 | Hannula | ................ | G06N 20/00 |
| 11,244,203 B2* | 2/2022 | Zhong | ................... | G06V 10/25 |
| 2009/0287476 A1* | 11/2009 | Johnson | ................ | G06F 40/205 |
| | | | | 704/10 |
| 2017/0134412 A1* | 5/2017 | Cheng | ................... | H04L 67/306 |
| 2018/0039555 A1* | 2/2018 | Salunke | ............. | G06F 11/3006 |
| 2019/0108196 A1* | 4/2019 | Hannula | ............... | G06F 18/214 |
| 2020/0042611 A1* | 2/2020 | Sparrow | ............... | G06F 16/374 |
| 2020/0089761 A1* | 3/2020 | Guerra | .................... | G06F 40/30 |
| 2020/0159916 A1* | 5/2020 | Nguyen | ............. | G06F 11/3072 |
| 2020/0311262 A1* | 10/2020 | Nguyen | ................ | G06F 21/554 |

(Continued)

OTHER PUBLICATIONS

"Ethan M. Rudd, Ahmed Abdalla", "Training Transformers for Information Security Tasks: A Case Study on Malicious URL Prediction", 2020, "FireEye Inc.", 8 (Year: 2020).*

(Continued)

*Primary Examiner* — Michael W Chao
*Assistant Examiner* — Raghavender Cholleti
(74) *Attorney, Agent, or Firm* — Lee & Hayes, P.C.

(57) ABSTRACT

A command line anomaly detection system can generate anomaly scores associated with command line entries, such that command line entries associated with the highest anomaly scores can be identified. The command line anomaly detection system can include a transformer model trained, via unsupervised machine learning, to determine meanings of components of individual command line entries. The command line anomaly detection system can also include an anomaly detection model trained, via unsupervised machine learning, to determine anomaly scores based on the meanings of components of individual command line entries determined by the transformer model.

20 Claims, 5 Drawing Sheets

(56) References Cited

U.S. PATENT DOCUMENTS

2020/0327225 A1* 10/2020 Nguyen ................ G06N 3/084
2020/0364607 A1* 11/2020 BahenaTapia ........... G06N 7/01

OTHER PUBLICATIONS

"Jacob Devlin, Ming-Wei Chang, Kenton Lee, Kristina Toutanova", "BERT: Pre-training of Deep Bidirectional Transformers for Language Understanding", 2019, "Google AI Language", 16 (Year: 2019).*

* cited by examiner

ANOMALOUS COMMAND LINE ENTRY DETECTION

TECHNICAL FIELD

The present disclosure relates to processing command line entries provided via command line interfaces on computing devices, particularly with respect to detecting command line entries that may be anomalous relative to other command line entries.

BACKGROUND

Operating systems and other software executing on computing devices can provide command line interfaces (CLIs). CLIs can allow users, or software, to input text-based command line entries that can initiate and/or control operations of software applications, operating systems, and/or other elements of computing devices. A command line entry can have a structure that includes a filepath, a name of an executable, arguments, commands, and/or other elements.

For example, a user may use a CLI provided by an operating system of a computer to enter command line entries. Such command line entries may cause the operating system to initiate execution of a software application, change a working directory, copy files, and/or perform other operations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
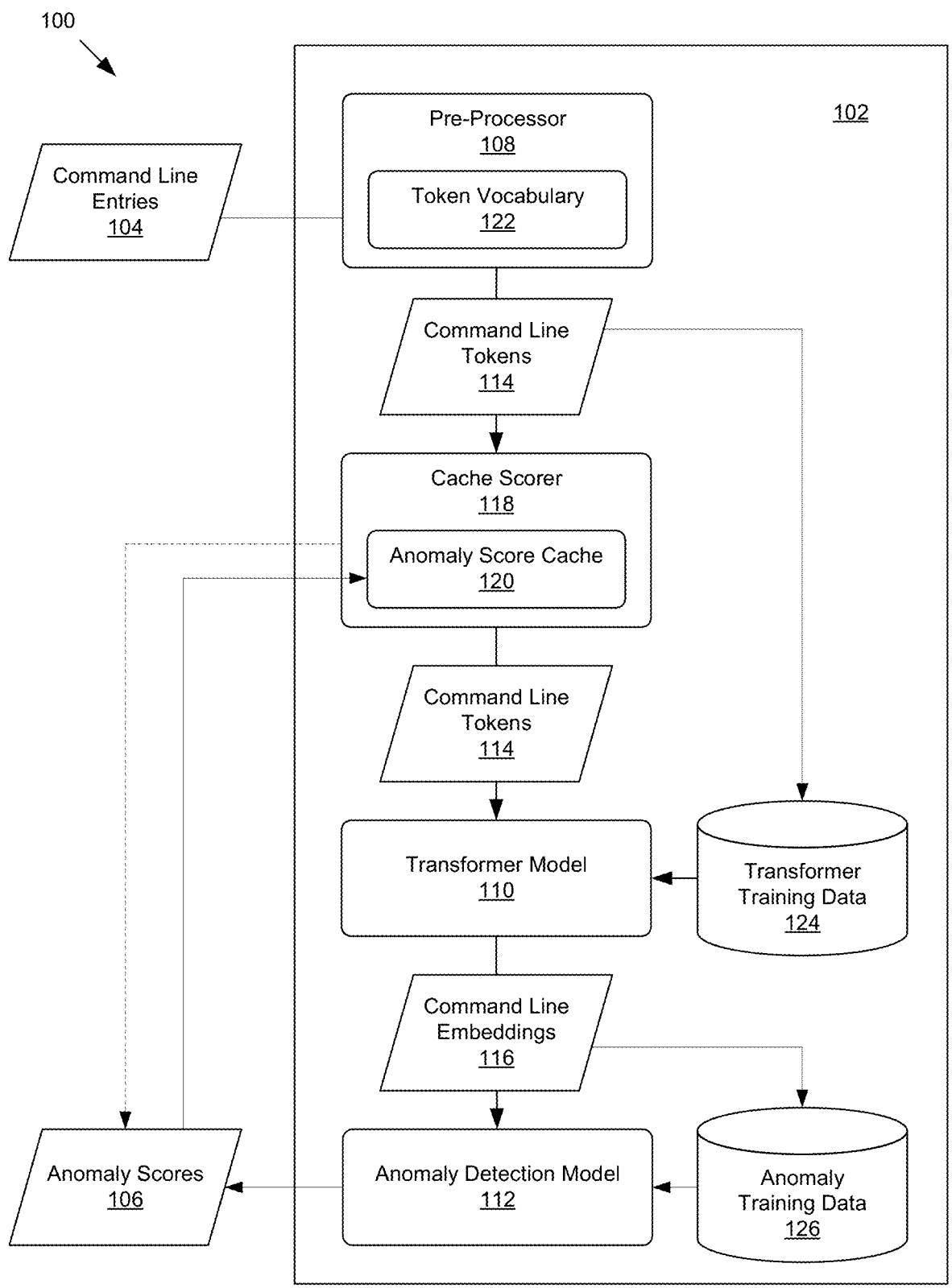
FIG. 1 shows an example of a command line anomaly detection system.

Command line entries can be used to input commands to manage and/or control operating systems and other software executing on computing devices. For example, operating systems and other software executing on computing devices, such as personal computers, servers, firewalls, and/or other computing devices, can provide CLIs that accept command line entries. Command line entries can initiate applications, manage execution of applications, configure systems, navigate through directories, copy files, and/or cause performance of other types of operations on computing devices.

While many command line entries may be routine and/or innocuous, other command line entries may be anomalous. A command line entry can be considered anomalous if the command line entry is an outlier relative to the structure and/or context of other command line entries. For example, if a command line entry input by a user contains elements that are different from elements of other command line entries, are rare relative to other command line entries, are used in an unusual context relative to other command line entries, and/or have other variations from other command line entries, the command line entry may be considered anomalous.

Some anomalous command line entries can be indicative of malware, such as a command line entry that initiates execution of malware on a computing device or that indicates that malware is already executing on the computing device. Other command line entries may be anomalous because the command line entries indicate software misconfigurations, are associated with old versions of software applications that are out of date, and/or otherwise indicate that the command line entries are outliers relative to other command line entries.

It can be difficult to determine which command line entries should be considered anomalous. For example, as noted above, command line entries may be anomalous for many reasons, such as that they reference old versions of software applications, indicate misconfigurations, indicate malware, and/or other reasons. Accordingly, it can be difficult to develop and/or implement rules or models that can detect multiple types of anomalies with command line entries, including new types of anomalies that develop over time. Additionally, if a system receives a large number of command line entries to process, it can be difficult to determine which of the command line entries are the most likely to be anomalous and should be flagged for further review.

However, the systems and methods described herein can use unsupervised machine learning to train models to detect command line entries that are the most likely to be anomalous. Because such models can be trained using unsupervised machine learning, the models can learn to identify outliers within a set of command line entries, and thus identify command line entries that are anomalous relative to other command line entries for one or more reasons. The models can include a transformer model that can determine semantic and/or contextual meanings of components of individual command line entries. The models can also include an anomaly detection model that can determine, based on the semantic and/or contextual meanings of components of individual command line entries, corresponding anomaly scores indicating whether the individual command line entries are outliers relative to other command line entries.

FIG. 1 shows an example 100 of a command line anomaly detection system 102. The command line anomaly detection system 102 can receive command line entries 104, such as instances of text-based command line input provided via command line interfaces on computing devices. The command line anomaly detection system 102 can also generate corresponding anomaly scores 106 associated with the command line entries 104. The anomaly scores 106 can indicate how likely corresponding command line entries 104 are to be anomalous, relative to other command line entries 104. For example, command line entries 104 associated with higher anomaly scores 106 may be more likely to be anomalous than command line entries 104 associated with lower anomaly scores 106. An anomalous command line entry can be an outlier, relative to other command line entries 104.

The command line anomaly detection system 102 can execute on one or more servers, cloud computing elements, or other computing systems. As an example, the command line anomaly detection system 102 can operate on a server of digital security network. The command line anomaly detection system 102 can receive, via the Internet and/or other networks, command line entries 104 associated with multiple computing devices, such as personal computers, servers, firewalls, other network elements, and/or other types of computing devices. For example, sensors, such as digital security agents, antivirus programs, event data collectors, and/or other elements, can execute locally on individual computing devices. The sensors can identify and/or capture command line entries 104 entered by users and/or software on the computing devices. The sensors executing locally on the computing devices can transmit copies of the command line entries 104 to the command line anomaly detection system 102 operating in the digital security network, for instance via the Internet and/or other networks. Accordingly, the command line anomaly detection system 102 can receive command line entries 104 that originated from multiple computing devices, and can generate corresponding anomaly scores 106 associated with the command line entries 104.

A command line entry can be a string of characters. The command line entry can also have a structure that includes elements such as a filepath, an executable name, arguments, commands, and/or other elements. As an example, a command line entry can be a string such as "C:\WINDOWS\system32\svchost.exe-k NetworkService-p-s Dnscache." In this example, "C:\WINDOWS\system32\" can be a filepath, "svchost.exe" can be the name of an executable, and "-k NetworkService-p-s Dnscache" can be a set of arguments. In other examples, command line entries 104 can have other elements and/or structures.

Figure 3:
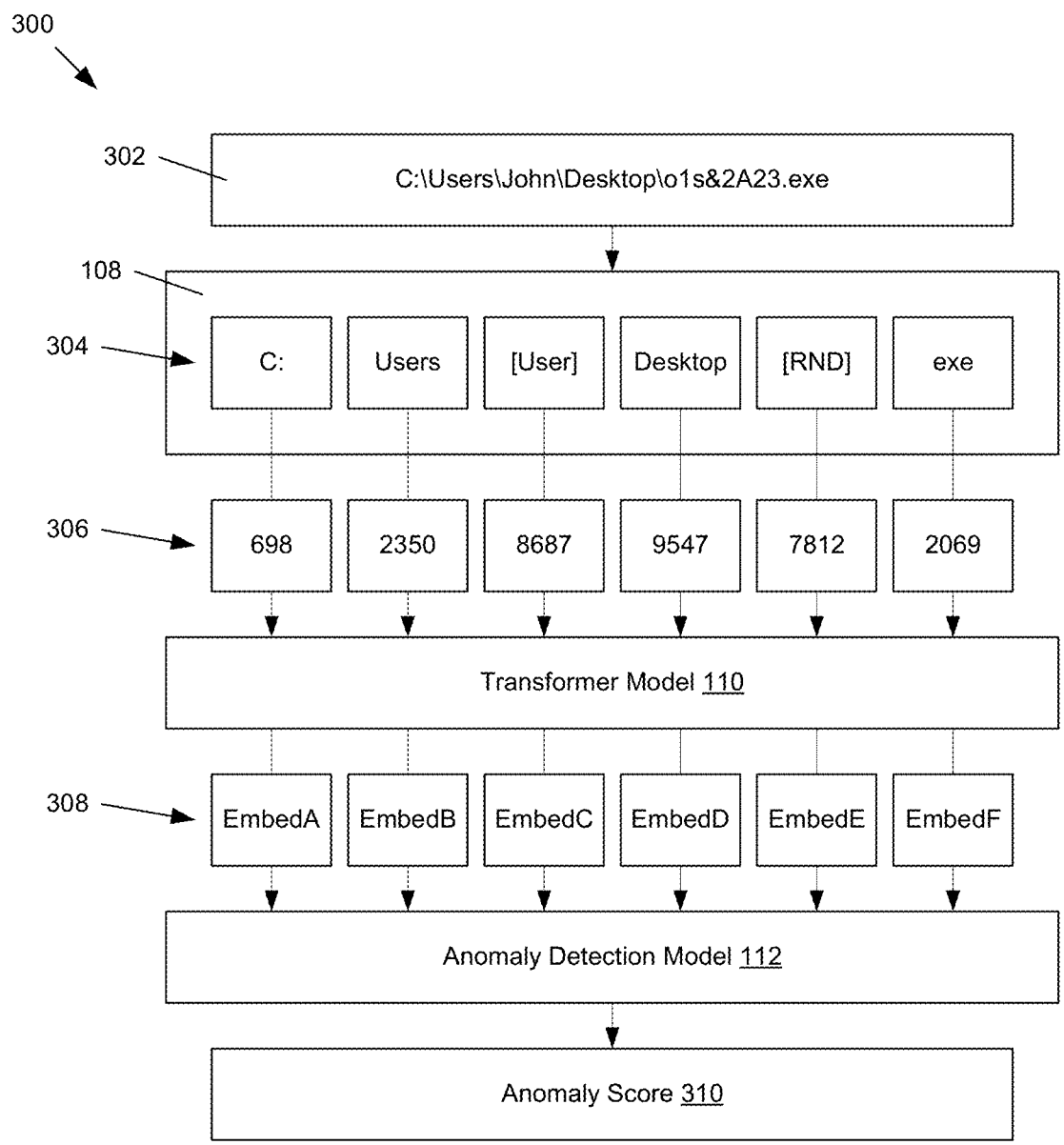
FIG. 3 shows an example of types of data that can be generated by, and pass between, elements of the command line anomaly detection system in association with a particular command line entry.

The command line anomaly detection system 102 can have a pipeline of elements that can determine anomaly scores 106 associated with the individual command line entries 104. The pipeline of the command line anomaly detection system 102 can include a pre-processor 108, a transformer model 110, and an anomaly detection model 112. An example of types of data that can be generated by, and pass between, elements of pipeline of the command line anomaly detection system 102 in association with a particular command line entry is shown in FIG. 3, discussed further below.

To process a particular command line entry, the pre-processor 108 of the command line anomaly detection system 102 can identify individual components of the command line entry. The pre-processor 108 can also determine command line tokens 114 that represent corresponding components of the command line entry. For example, the command line tokens 114 can be numerical representations of textual components of the particular command line entry, which can be processed by the transformer model 110. The transformer model 110 can generate command line embeddings 116 that indicate semantic and/or contextual meaning of corresponding command line tokens 114 associated with the command line entry. The anomaly detection model 112 can use the command line embeddings 116 associated with the command line entry to generate an anomaly score associated with the command line entry.

The transformer model 110 can be based on one or more types of natural language processing (NLP) systems that can analyze textual components, for instance via numerical representations of the textual components, to determine semantic and/or contextual meaning of the textual components. Although the command line entries 104 may not be written in natural language, and may have structures that do not match English grammar rules or other natural language grammar rules, the overall order, combination, and/or structure of textual components of command line entries 104 can indicate which command line entries 104 are anomalous relative to other command line entries 104.

For instance, a particular substring may commonly appear at a particular position within command line entries 104, and/or commonly appear before or after one or more other related substrings within command line entries 104. Accordingly, the presence of that particular substring in a command line entry at that particular position, and/or in combination with other related substrings, may not be an outlier and thus not be considered anomalous. However, if that same substring appears in a different position, appears without other related substrings, or appears with unrelated substrings in command line entries 104, the command line entries 104 may be outliers and thus be considered anomalous.

As an example, "C:\ProgramFiles\TestApp\TestApp.exe" may be a relatively routine command line entry that would not be considered anomalous, but "C:\ProgramFiles\TestApp\TestApp.exe StartMinimized" may be considered anomalous because the "TestApp.exe" application is not usually initiated in command line entries 104 in association with a "StartMinimized" argument. As another example, "C:\ProgramFiles\TestApp\v1\TestApp.exe" may be considered an anomalous command line entry due to the presence of the substring "v1," because most other command line entries 104 that invoke the "TestApp.exe" application include substrings of "v9" instead of "v1." Accordingly, in this example, the presence of "v1" may indicate that a computer is using an out-of-date first version of the "TestApp.exe" application, instead of a more commonly-used ninth version of the "TestApp.exe" application. As yet another example, a command line entry that includes "AppData\Local\Temp\TestApp.exe" may be considered anomalous if the "TestApp.exe" application is normally invoked using a filepath that includes a "TestApp" subfolder and is not normally invoked from a "Temp" subfolder. In these examples, individual components of the command line entries 104 may or may not be anomalous in isolation, but the order, combination, and/or structure of the components may indicate anomalies.

Accordingly, based on command line tokens 114, such as numerical values, that represent textual components of a command line entry, the transformer model 110 can use NLP principles to determine meanings of individual textual components of the command line entry, and/or meanings of relationships between different textual components of the command line entry. Such meanings can be indicated by the command line embeddings 116 produced by the transformer model 110. Based on meanings indicated by the command line embeddings 116, the anomaly detection model 112 can generate corresponding anomaly scores 106 associated with the command line entries 104, as described further below.

In some examples, the pipeline of the command line anomaly detection system 102 can also include a cache scorer 118. The cache scorer 118 can have, or access, an anomaly score cache 120 that stores anomaly scores 106 generated by the command line anomaly detection system 102 based on previously-determined sets of command line tokens 114. Accordingly, if a set of command line tokens 114 associated with a newly received command line entry matches a set of command line tokens 114 associated with a previously-processed command line entry, the cache scorer 118 can retrieve the corresponding anomaly score from the anomaly score cache 120 rather than using the transformer model 110 and the anomaly detection model 112 to further process data in association with the newly received command line entry.

As discussed above, the pre-processor 108 of the command line anomaly detection system 102 can be configured to identify components of a command line entry, and to determine command line tokens 114 that correspond to the components of the command line entry. Individual command line tokens 114 can be representations of corresponding components of a command line entry. For example, although a command line entry can include textual components, the command line tokens 114 can be numerical representations of the textual components of the command line entry that can be processed by the transformer model 110 as described further below.

The pre-processor 108 can identify components of a command line entry, to be represented as command line tokens 114, by splitting the command line entry into smaller pieces. For instance, based on the string of the example command line entry discussed above, "C:\WINDOWS\system32\svchost.exe-k NetworkService-p-s Dnscache," the pre-processor 108 can divide the string into multiple components, such as substrings, including "C:," "WINDOWS," "system32," "svchost.exe," "-k," "NetworkService," "-p," "-s," "D," "##ns," and "##cache."

In some examples, the pre-processor 108 can split a command line entry string into different components at positions in the string that are determined based on the presence of one or more types of delimiters in the string. Delimiters can be spaces, slashes, endline characters, and/or other characters or substrings that the pre-processor 108 is configured to use as delimiters.

In other examples, the pre-processor 108 can also, or alternately, split a command line entry string into components based on a predetermined token vocabulary 122. The token vocabulary 122 can have entries for substrings that are most likely to appear in strings of command line entries 104. The pre-processor 108 can accordingly divide each command line entry into multiple components based on finding substrings in the command line entries 104 that match entries in the token vocabulary 122. Each entry in the token vocabulary 122 can be associated with a corresponding value, such as a unique index value associated with the corresponding entry, which the pre-processor 108 can use as values of corresponding command line tokens 114.

The token vocabulary 122 can have been generated based on a sample set of command line entries 104 provided to the pre-processor 108. The number of entries to be included in the token vocabulary 122 can be a configurable value. As an example, if the number of vocabulary entries was set to 30,000, the pre-processor 108 can have identified the 30,000 most common substrings that were present within a sample set of command line entries 104, and can have used the identified substrings as 30,000 entries of the token vocabulary 122. Each entry in the token vocabulary 122 can be associated with a corresponding numerical index value, such as index values of 1 to 30,000 in examples that have 30,000 vocabulary entries. Although there are 30,000 vocabulary entries in this example, in other examples the token vocabulary 122 generated and/or used by the pre-processor 108 can have fewer, or more, than 30,000 entries based on a configurable number of vocabulary entries.

Some of the most common substrings in command line entries 104, which may be determined to be entries of the token vocabulary 122 as discussed above, may be relatively long substrings such as "WINDOWS" or "system32," and/or may be substrings that are commonly separated by delimiters within command line entries 104. Accordingly, the pre-processor 108 can split a command line entry string into components based on identifying substrings, within the string, that match instances of such entries in the token vocabulary 122.

However, other common substrings may be relatively short, such as one or two characters, or be substrings of characters that may appear together within command line entries 104 without being separated by delimiters. Accordingly, the token vocabulary 122 can include corresponding entries that can be combined to form substrings of command line entries 104 that are not included in the vocabulary.

As an example, in the example command line entry string discussed above, "C:\WINDOWS\system32\svchost.exe-k NetworkService-p-s Dnscache," the "Dnscache" substring may not be in the token vocabulary 122 because "Dnscache" did not commonly appear in a sample set of command line entries 104 that was used to generate the token vocabulary 122. However, smaller elements associated with the "Dnscache" substring, such as "D," "##ns," and "##cache," can be in the token vocabulary 122, for instance if those elements more commonly appeared in the sample set of command line entries 104 that was used to generate the token vocabulary 122. Accordingly, even though the "Dnscache" substring does not include any delimiters, the pre-processor 108 can split the "Dnscache" substring into "D," "##ns," and "##cache" components.

In some examples, the pre-processor 108 can also be configured to replace one or more types of variable substrings in command line entries 104 with corresponding replacement substrings. Such variable substrings can be substrings that, due to positions within command line entries and/or types of data represented by the substrings, may be expected to vary between different command line entries 104. Such variable substrings can include usernames, long numerical values, strings of random characters, and/or other types of substrings.

Because such variable substrings may be expected to vary between different command line entries 104, differences between the substrings may not be indicative of anomalous command line entries 104. Accordingly, the pre-processor 108 can replace variable substrings with replacement substrings, such that downstream elements of the command line anomaly detection system 102 can avoid considering differences between the variable substrings when determining corresponding anomaly scores 106.

For example, the pre-processor 108 can be configured to replace such variable substrings with predefined replacement substrings, such that the pre-processor 108 can determine corresponding command line tokens 114 based on the replacement substrings instead of the original values of the variable substrings. The predefined replacement substrings may have entries in the token vocabulary 122, such that the predefined replacement substrings can be associated with corresponding command line tokens 114. By replacing variable substrings with predefined replacement substrings, command line tokens 114 associated with the predefined replacement substrings can be passed to other elements of the pipeline of the command line anomaly detection system 102. This can prevent downstream elements such as the transformer model 110 and the anomaly detection model 112 processing command line tokens 114 or corresponding command line embeddings 116 associated with one or more portions of original values of variable substrings, which may not be relevant to identifying anomalous command line entries 104.

As a first example, the pre-processor 108 can be configured to replace username substrings in command line entries 104 with a corresponding replacement substring of "[USER]," or another replacement substring. The pre-processor 108 can be configured to identify username strings based on expected positions of username strings within command line entries 104, such as positions within filepaths that follow "C:\Users\," and/or at other defined positions. For example, a first user named John may use a first computing device to input a first command line entry of "C:\Users\John>cd Desktop," while a second user named Sarah may use a second computing device to input a second command line entry of "C:\Users\Sarah>cd Desktop." In this example, the difference between the usernames in the two command line entries 104 may not be expected to be indicate anomalous command line entries 104, so the pre-processor 108 can be configured to replace "John" and "Sarah" in the two command line entries 104 with "[USER]." Accordingly, the pre-processor 108 can convert both command line entries 104 to identically read "C:\Users\[USER]>cd Desktop," and the pre-processor 108 can thus determine that both command line entries 104 are associated with identical sets of command line tokens 114. Although in this example the two original command line entries 104 were identical except for the username substrings, the pre-processor 108 can replace any instance of a username substring within a command line entry with "[USER]" even if the command line is not otherwise identical to other one or more other command line entries 104.

As a second example, the pre-processor 108 can be configured to replace numerical values, represented as substrings of numbers that have more than a threshold number of digits, with a replacement substring of "[NR]" or another replacement substring. For example, if the threshold length is set to six digits, and a first command line entry string includes a substring for an eight-digit numerical value of "56813571," the pre-processor 108 can replace "56813571" with "[NR]" in the first command line entry. Similarly, if a second command line entry string includes a substring for a nine-digit numerical value of "315433584," the pre-processor 108 can also replace "315433584" with "[NR]" in the second command line entry. Accordingly, although different command line entries 104 may include different numerical values, those numerical values can be replaced by the same replacement substring so that instances of the same command line token can represent the instances of the same replacement substring in the different command line entries 104.

As a third example, the pre-processor 108 can be configured to replace strings of random characters with a replacement substring of "[RND]" or another replacement substring. Such random strings may be relatively common in command lines entries 104. For example, cryptographic hash functions can be used to convert strings of any length into hash values, such as fixed-length strings of characters from which it may be difficult or impossible to return to the original strings. Such hash values can be included in command line entries 104, instead of the original strings. Because the characters in such a hash value string generated by a hash function may be difficult or impossible to convert back to an original strings, the characters of the hash value string can be considered to be random by the pre-processor 108. Although such strings of random characters of hash values can differ between different command line entries 104, the differences between the hash values can be expected based on how cryptographic hash functions generate such hash values, and therefore may not be indicative of anomalous command line entries 104. Accordingly, the pre-processor 108 can replace such random strings associated with hash values, and/or other types of random strings, with a replacement substring of "[RND]" or another replacement substring.

The pre-processor 108 can be configured to identify random substrings, within command line entries 104, that are to be replaced with "[RND]" or another replacement substring. The pre-processor 108 can, in some examples, have a first tokenizer that attempts to divide a command line entry into components based on a first token vocabulary. If the first tokenizer divides a substring of the command line entry into more than a threshold number of components that are smaller than a threshold size based on the first token vocabulary, the pre-processor 108 can determine that the substring is a string of random characters, and can replace the substring with "[RND]." For instance, if the threshold number of components is set to seven, the threshold size is set to four characters, and the first tokenizer divides a particular substring into more than seven smaller components that are each less than four characters long, the pre-processor 108 can consider that particular substring to be random and replace the substring with "[RND]." As an example, the first tokenizer divide may divide a substring of "DSfao15%239*0_" into smaller components of one or two characters, such as "DS," "f," "a," "o," "1," "5," "%," "2," "3," "9," "*," "0," and "_," because entries for longer pieces of the "DSfao15%239*0_" substring are not in the first token vocabulary. Accordingly, based on the number of components divided out from the "DSfao15%239*0_" substring, the pre-processor 108 can determine that "DSfao15%239*0_" is a random substring, and can replace "DSfao15%239*0_" with "[RND]." The pre-processor 108 can then use a second tokenizer, based on a second token vocabulary, to generate command line tokens 114 from the modified command line entry that now includes "[RND]."

In this example, the first token vocabulary may not include an entry for "[RND]," while the second token vocabulary does include an entry for "[RND]" such that a command line token corresponding to "[RND]" can be determined. The second token vocabulary may also have other different entries than the first token vocabulary, for instance to omit entries from the first token vocabulary and/or to add other entries that were not included in the first token vocabulary. For example, although the first token vocabulary may be based on a set of the most common substrings in a sample set of command line entries 104, the most common substrings in the sample set of command line entries 104 may differ after random substrings in the sample set have been identified and replaced with "[RND]." The second token vocabulary may be based on the set of the most common substrings in the sample set following replacement of the random substrings with "[RND]."

After identifying components of a command line entry, and/or replacing any variable substrings with corresponding replacement substrings, the pre-processor 108 can determine corresponding command line tokens 114 that represent the components of the command line entry. Values of the command line tokens 114 can be based on corresponding index values, or other values, indicated by the token vocabulary 122 as discussed above. As an example, the substring "C:" may be associated with a value of 132 in the token vocabulary 122, while the substring "WINDOWS" may be associated with value of 4562 in the token vocabulary 122.

As another example, replacement substrings such as "[USER]," "[NR]," and "[RND]" can be associated with corresponding values in the token vocabulary 122. Accordingly, the pre-processor 108 can determine the values that correspond with original and/or replacement components of a command line entry, and output those numerical values as a set of command line tokens 114 associated with the command line entry.

As an example, the pre-processor 108 can convert a command line entry into a corresponding vector of numerical values, with each numerical value in the vector being a command line token. Such a vector of numerical values can be provided to the transformer model 110 and/or the cache scorer 118 as a set of command line tokens 114 that correspond to the command line entry.

As discussed above, the cache scorer 118 can process command line tokens 114 that correspond to a command line entry based on the anomaly score cache 120. The anomaly score cache 120 can map previously-processed sets of command line tokens 114 to corresponding previously-determined anomaly scores 106. For example, if the transformer model 110 generates command line embeddings 116 based on a set of command line tokens 114, and the anomaly detection model 112 generates a corresponding anomaly score based on the command line embeddings 116, the anomaly score can be stored in the anomaly score cache 120 in association with the set of command line tokens 114.

Accordingly, if the cache scorer 118 determines that a set of command line tokens 114, associated with a command line entry, matches a set of command line tokens 114 in the anomaly score cache 120, the cache scorer 118 can output the corresponding anomaly score indicated in the anomaly score cache 120. The command line anomaly detection system 102 can thus avoid using the transformer model 110 and the anomaly detection model 112 to generate anomaly scores 106 for command line entries 104 that are associated with sets of command line tokens 114 that have already been processed by the command line anomaly detection system 102. However, if the cache scorer 118 determines that a set of command line tokens 114, associated with a command line entry, does not match a set of command line tokens 114 in the anomaly score cache 120, the command line anomaly detection system 102 can use the transformer model 110 and the anomaly detection model 112 to generate an anomaly score for the command line entry. The generated anomaly score can also be added to the anomaly score cache 120, in association with the corresponding set of command line tokens 114.

The transformer model 110 can be configured to generate command line embeddings 116 from sets of command line tokens 114 associated with command line entries 104. The command line embeddings 116 can be numerical values that indicate semantic and/or contextual meaning of the corresponding command line tokens 114. As discussed above, the transformer model 110 can use NLP principles to determine semantic and/or contextual meaning of textual components of command line entries 104, for instance based on numerical representations of those textual components expressed in the command line tokens 114. Such semantic and/or contextual meaning of textual components can be indicated in the command line embeddings 116.

The transformer model 110 can be a neural network, or other type of machine learning model, that has been trained to generate command line embeddings 116 based on transformer training data 124. The transformer training data 124 can include sets of command line tokens 114 associated with a sample set of command line entries 104, such as command line tokens 114 generated from a set of previous command line entries 104 received by, or provided to, the command line anomaly detection system 102.

In some examples, the transformer model 110 can be a Bidirectional Encoder Representation from Transformers (BERT) model. A BERT model can be configured to determine semantic and/or contextual meaning of components of a command line entry, represented by command line tokens 114, based at least in part on where those components appear in context relative to both earlier and later components of the command line entry. The BERT model can thus be bidirectional, and determine meaning of components of a command line entry relative to earlier and/or later components of the command line entry. For example, if a command line entry has five textual components, and been divided into five corresponding command line tokens 114, the BERT model may determine a command line embedding associated with the third command line token by determining how the third command line token relates to any or all of the first command line token, the second command line token, the fourth command line token, or the fifth command line token.

In examples in which the transformer model 110 is a BERT model, the pre-processor 108 may be at least partially based on, or be associated with, the BERT model. For instance, the pre-processor 108 can include a BERT tokenizer that generates the command line tokens 114 associated with each command line entry.

The transformer model 110 can be trained, based on the transformer training data 124, using an unsupervised machine learning approach. In some examples, the unsupervised machine learning approach can be based on masked language modeling (MLM). In MLM, command line tokens 114 associated with individual command line entries, from the transformer training data 124, can be randomly masked. The transformer model 110 can be trained to predict the values of the masked command line tokens 114, based on the values of the other command line tokens 114 that were not masked. Accordingly, the transformer model 110 can be trained to learn how the presence, combination, and/or order of certain command line tokens 114 relates to the presence, combination, and/or order of other command line tokens 114.

Based on such training, the transformer model 110 can process command line tokens 114 associated with command line entries 104, and generate corresponding command line embeddings 116 that indicate meanings of the command line tokens 114 based on the presence, combination, and/or order of the command line tokens 114. Accordingly, if two different command line entries 104 include the same substring, but have that same substring at different places and/or in combination with different other substrings, the transformer model 110 may determine that those differences cause the same substring to have different meanings within the different command line entries 104. The transformer model 110 can therefore output command line embeddings 116, generated from command line tokens 114 that represent the same substring, that have different values to indicate differences in the meanings of the same substring within the different command line entries 104.

Each of the command line embeddings 116 can be associated with a corresponding command line token, which represents a textual component of a command line entry as discussed above. A command line embedding may, in some examples, be a multi-dimensional vector, such as a vector with 768 dimensions or any other number of vectors that may correspond to a number of embeddings that the transformer model 110 is configured to use.

The command line embeddings 116 generated by the transformer model 110 in association with a command line entry can be provided to the anomaly detection model 112. As discussed above, the anomaly detection model 112 can be configured to use command line embeddings 116 associated with a command line entry to generate a corresponding anomaly score for the command line entry.

The anomaly detection model 112 can be based on one or more machine learning models that have been trained on anomaly training data 126 to detect command line embeddings 116 that are outliers relative to other command line embeddings 116. The anomaly detection model 112 can therefore generate an anomaly score for a particular command line entry that indicates how much of an outlier a set of command line embeddings 116 associated with the command line entry is, relative to other sets of command line embeddings 116 associated with other command line entries 104.

The one or more machine learning models of the anomaly detection model 112 can be trained on the anomaly training data 126 using an unsupervised machine learning approach. The anomaly training data 126 can include sets of command line embeddings 116 associated with a sample set of command line entries 104, such as command line embeddings 116 generated by the transformer model 110 in association with previously-processed command line entries 104. By using an unsupervised machine learning approach based on the anomaly training data 126, the anomaly detection model 112 can be trained to determine which command line embeddings 116, and/or patterns or combinations of command line embeddings 116, are relatively common and which are outliers associated with anomalous command line entries 104. Anomalies associated with sets of command line embeddings 116 derived from command line entries 104 can correspond to anomalies with the original command line entries 104.

The machine learning models can be probabilistic models, proximity-based models, outlier ensemble models, neural networks, and/or other types of models. The anomaly detection model 112 can, for example, be based on one or more of a Local Outlier Factor (LOF) model, a Clustering Based Local Outlier Factor (CBLOF) model, a Principal Component Analysis (PCA) model, a Copula-based Outlier Detection (COPOD) model, an AutoEncoder model, an Isolation Forest (iForest) model, and/or other types of models.

Different types of machine learning models may use different approaches to determine anomaly scores 106. The LOF model can determine an anomaly score based on a k-nearest neighbor algorithm. The CBLOF model can determine an anomaly score based on a cluster-based local outlier factor indicating a distance to a closest large cluster centroid. The PCA model can determine an anomaly score as a sum of a projected distance of a sample of eigenvectors. The COPOD model can determine an anomaly score by comparing features of a sample against all features of other samples and estimating tail probabilities. The AutoEncoder model can be a deep learning model that determines an anomaly score by reducing a feature space and then computing reconstruction errors. The iForest model can isolate observations by randomly selecting a split value from the range of values of a feature, and determine an anomaly score based on the number of splits required to isolate a sample, because an outlier can require fewer splits until it is isolated from the rest of the data.

Although the anomaly detection model 112 can be based on a single type of machine learning model, the anomaly detection model 112 can instead be based on an ensemble of different types of machine learning models. For example, the anomaly detection model 112 can be an ensemble model that uses a combination of a PCA model, a COPOD model, an iForest model, and an AutoEncoder model, as discussed further below with respect to FIG. 2.

The anomaly detection model 112 can use the command line embeddings 116 derived from command line entries 104 to generate anomaly scores 106 associated with the command line entries 104. Some anomaly scores 106 may indicate that corresponding command line entries 104 are relatively unlikely to be anomalous, while other anomaly scores 106 may indicate that corresponding command line entries 104 are more likely to be anomalous. Accordingly, in some examples, a number or percentage of command line entries 104, processed by the command line anomaly detection system 102 over a period of time, with the highest anomaly scores 106 can be identified as potentially anomalous and be flagged for further analysis.

As an example, command line anomaly detection system 102 may receive and process hundreds of thousands of command line entries 104 per day, three hundred of the command line entries 104 with the highest anomaly scores 106 each day can be flagged for further review. Accordingly, a team of analysts may review the previous day's three hundred flagged command line entries 104 to determine whether the flagged command line entries 104 are actually anomalous, determine reasons why the flagged command line entries 104 are anomalous, and/or take actions in response. For example, if an analyst determines that a first command line entry had a high anomaly score because the first command line entry indicates usage of an out-of-date software application, the analyst may cause a notification of outdated software to be sent to a customer associated with the computing device where the first command line entry originated. Similarly, if an analyst determines that a second command line entry had a high anomaly score because the second command line entry indicates a misconfiguration of a software application, the analyst may cause a similar notification of misconfigured software to be sent to a customer associated with the computing device where the second command line entry originated. In other examples, such notifications may be sent automatically by the command line anomaly detection system 102.

Review of flagged command line entries 104, based on corresponding anomaly scores 106, can also be used to generate a training data set for a separate supervised machine learning system that can be used to detect anomalous command line entries 104. For example, the transformer model 110 and the anomaly detection model 112 of the command line anomaly detection system 102 can be trained using unsupervised machine learning approaches, as discussed above. In such unsupervised machine learning approaches, the transformer training data 124 and the anomaly training data 126 may not have labels indicating which command line entries 104 were anomalous. However, by using such unsupervised machine learning approaches to train the transformer training data 124 and the anomaly training data 126, the transformer training data 124 and the anomaly training data 126 can be used as described herein to identify a subset of a group of command line entries 104 are most likely to be anomalous. For example, rather than reviewing hundreds of thousands of command line entries 104 received each day, analysts can review a subset of three hundred of those command line entries 104 that are associated with the highest anomaly scores 106. From that subset, the analysts can create labeling data for supervised machine learning indicating whether individual command line entries 104 should be considered anomalous, reasons why individual command line entries 104 should be considered anomalous, and/or other labeling data. Accordingly, such labeling data can be used, via supervised machine learning, to train another machine learning system to detect anomalous command line entries 104 and/or certain types of anomalous command line entries 104.

The command line anomaly detection system 102 can output anomaly scores 106 associated with command line entries 104, and/or identifications of flagged command line entries 104 that had the highest anomaly scores 106. In some examples, the output can be a report or other notification that is emailed or otherwise provided to one or more users, systems, or entities, such as a team of analysts. In other example, the output can be displayed via a user interface associated with the command line anomaly detection system 102. The output can, in some examples, present visualizations of anomaly scores 106 associated with command line entries 104, as discussed further below with respect to FIG. 2.

In some examples, the transformer model 110 and/or the anomaly detection model 112 can be re-trained occasionally or periodically. For example, the transformer model 110 can be re-trained on new and/or expanded sets of transformer training data 124 every two months, while the anomaly detection model 112 can be re-trained on new and/or expanded sets of anomaly training data 126 every two weeks. Re-training schedules can vary and can be performed at the same time, at different times, and/or at different frequencies.

Re-training the transformer model 110 and/or the anomaly detection model 112 can allow the command line anomaly detection system 102 to change over time based on changes to what may be considered anomalous. For example, at a first point in time, most command line entries 104 that reference a particular software application may reference version five of the software application. Accordingly, at the first point in time, command line entries 104 that reference version five of the software application may not be considered anomalous. However, if by a second point in time version six of the software application has been released and most command line entries 104 that reference the particular software application now reference version six of the software application, command line entries 104 that still reference the now-outdated version five of the software application may be considered anomalous. By re-training the transformer model 110 and/or the anomaly detection model 112 based on more recent command line entries 104, the command line anomaly detection system 102 can be more likely to generate anomaly scores 106 that indicate command line entries 104 that would currently be considered anomalous.

Figure 2:
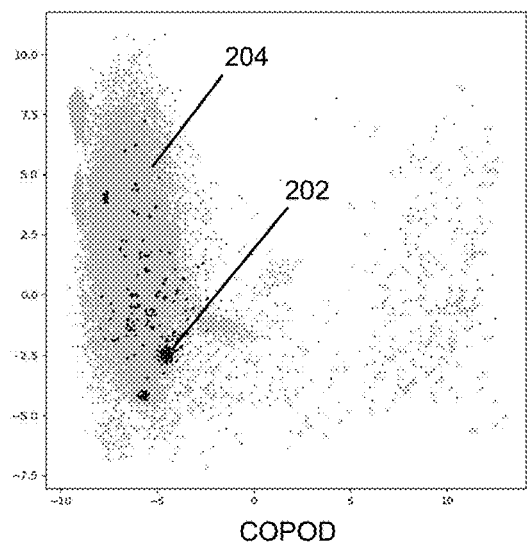
FIG. 2 shows visualizations of anomaly scores generated by examples of the anomaly detection model of the command line anomaly detection system.
Figure 2:
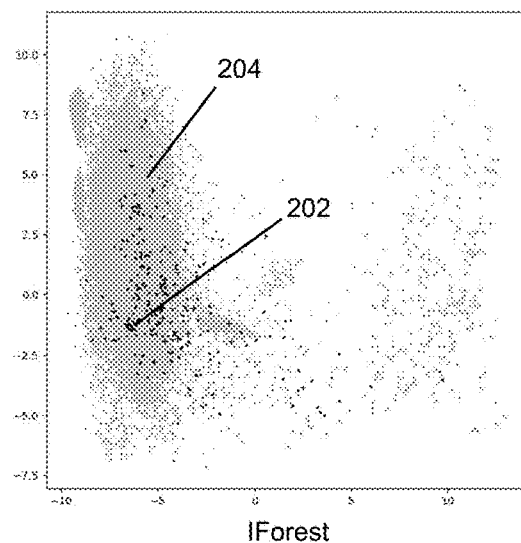
Figure 2:
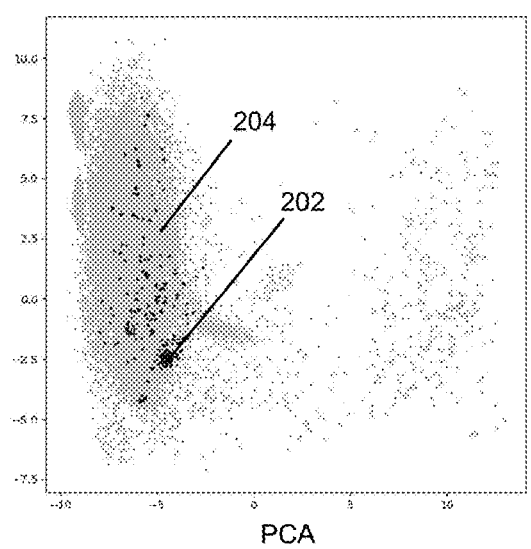
Figure 2:
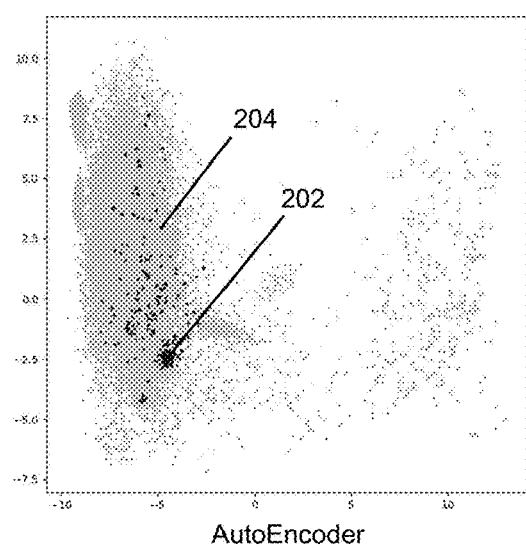
Figure 2:
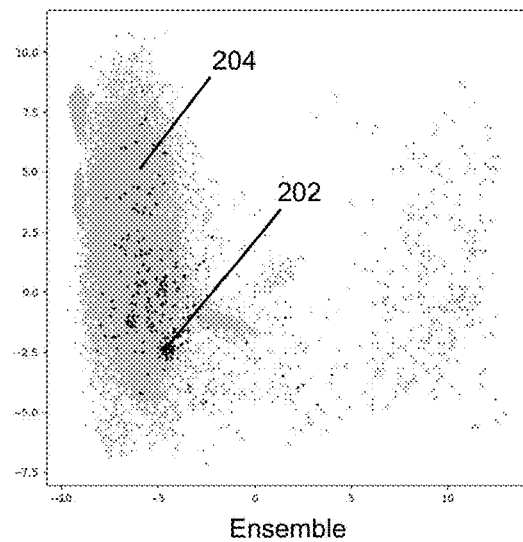

FIG. 2 shows visualizations 200 of anomaly scores 106 generated by examples of the anomaly detection model 112 of the command line anomaly detection system 102. As discussed above, the anomaly detection model 112 can be based on one or more types of machine learning models, such as a COPOD model, an iForest model, a PCA model, an AutoEncoder model, or an ensemble of the COPOD model, the iForest model, the PCA model, the AutoEncoder model. Different types of models may use different approaches to generate anomaly scores 106 as discussed above, and may accordingly have different strengths and weaknesses that can be mitigated by using an ensemble that combines multiple types of models. FIG. 2 includes visualizations 200 of anomaly scores 106 generated for the same set of command line entries 104 by different individual models and by the ensemble.

The anomaly detection model 112 can generate anomaly scores 106 for corresponding command line entries 104 as discussed above, such that likely anomalous command line entries 104 that are outliers associated with the highest anomaly scores 106 can be identified. The visualizations 200 shown in FIG. 2 have been generated using PCA to reduce a feature space associated with a set of example anomaly scores 106 from 768 components to two components, so that the visualizations 200 can be displayed in two dimensions. The dark gray dots 202 in the visualizations 200 represent a subset of two hundred and fifty command line entries 104 that were determined by each model or the ensemble model to have the highest anomaly scores 106. The light gray dots 204 in the visualizations 200 represent other command line entries 104 that were determined by the models to have lower anomaly scores 106 than the two hundred and fifty command line entries 104 represented by the dark gray dots. Accordingly, in the example shown in FIG. 2, a subset of two hundred and fifty command line entries 104 that may be likeliest to be anomalous among the larger set of command line entries 104 (represented by the dark gray dots 202) can be identified and/or be flagged for further review as discussed above.

FIG. 3 shows an example 300 of types of data that can be generated by, and pass between, elements of the command line anomaly detection system 102 in association with a particular command line entry. As discussed above, the command line anomaly detection system 102 can have a pipeline that includes the pre-processor 108, the transformer model 110, and the anomaly detection model 112.

The pre-processor 108 can receive a command line entry 302, such as an instance of the command line entries 104 shown in FIG. 1. In example 300, the command line entry 302 can be "C:\Users\John\Desktop\o1s&2A23.exe." The pre-processor 108 can be configured to determine individual components 304 of the command line entry 302 based on delimiters, the token vocabulary 122, replacement of variable substrings with replacement substrings, and/or other types of pre-processing operations. For example, the pre-processor 108 may divide the command line entry 302 into multiple components 304 at positions determined based on the presence of delimiters such as "\" and "." The pre-processor 108 can also replace a component representing the username "John" with a "[User]" replacement substring. The pre-processor 108 can additionally replace a component representing the substring "o1s&2A23" with a "[RND]" replacement substring. In some examples, the pre-processor 108 may use a first tokenizer to attempt to divide the substring "o1s&2A23" with smaller components, but determine based on the length and/or number of such smaller components exceeding thresholds that the substring "o1s&2A23" is a random substring suitable to be replaced with the "[RND]" replacement substring.

The pre-processor 108 can also determine command line tokens 306, such as the command line tokens 114 discussed above, that correspond to each of the components 304 of the command line entry 302. The command line tokens 306 can be numerical representations of the components 304. In some examples, the values of the command line tokens 306 can be defined in the token vocabulary 122. For instance, in example 300, the token vocabulary 122 may indicate that the "C:" component has a value of 698, the "Users" component has a numerical value of 2350, the "[User]" component has a numerical value of 8687, the "Desktop" component has a numerical value of 9547, the "[RND]" component has a numerical value of 7812, and the "exe" component has a numerical value of 2069.

The command line tokens 306 determined by the pre-processor 108 can be provided to the transformer model 110. The transformer model 110 can, for example, be a BERT model. The transformer model 110 can have been trained, using an unsupervised machine learning approach, on transformer training data 124 that includes command line tokens 114 associated with previously-processed command line entries 104. The transformer model 110 can generate command line embeddings 308, such as the command line embeddings 116 discussed above, based on the command line tokens 306. The command line embeddings 308 can each be one or more values, such as vectors of 768 values or any other number of values, that indicate semantic and/or contextual meaning of the corresponding command line tokens 306. For example, the values of the command line embeddings 308 associated with the command line tokens 306 that correspond to the "[RND]" and the "exe" components 304 may indicate how the "[RND]" and the "exe" components 304 relate to each other within the command line entry 302, and/or indicate that a random string does not usually precede "exe" in command line entries 104.

The command line embeddings 308 generated by the transformer model 110 can be provided to the anomaly detection model 112. The anomaly detection model 112 can be based on a single type of machine learning model, or an ensemble of multiple types of machine learning models, as discussed above. Each type of machine learning model can be trained, using an unsupervised machine learning approach, on anomaly training data 126 that includes command line embeddings 116 associated with previously-processed command line entries 104. The anomaly detection model 112 can use the command line embeddings 308 to generate an anomaly score 310 associated with the command line entry 302.

In example 300, the anomaly score 310 may be relatively high, for instance if a random string does not usually precede "exe" in command line entries 104. Accordingly, if the anomaly score 310 is above a threshold, the command line entry 302 may be flagged for further evaluation. An analyst may review the flagged command line entry 302 to determine whether and/or why the command line entry 302 may be considered to be anomalous, transmit a corresponding notification to a customer associated with the computing device from which the command line entry 302 was received, and/or perform other tasks associated with the command line entry 302.

Figure 4:
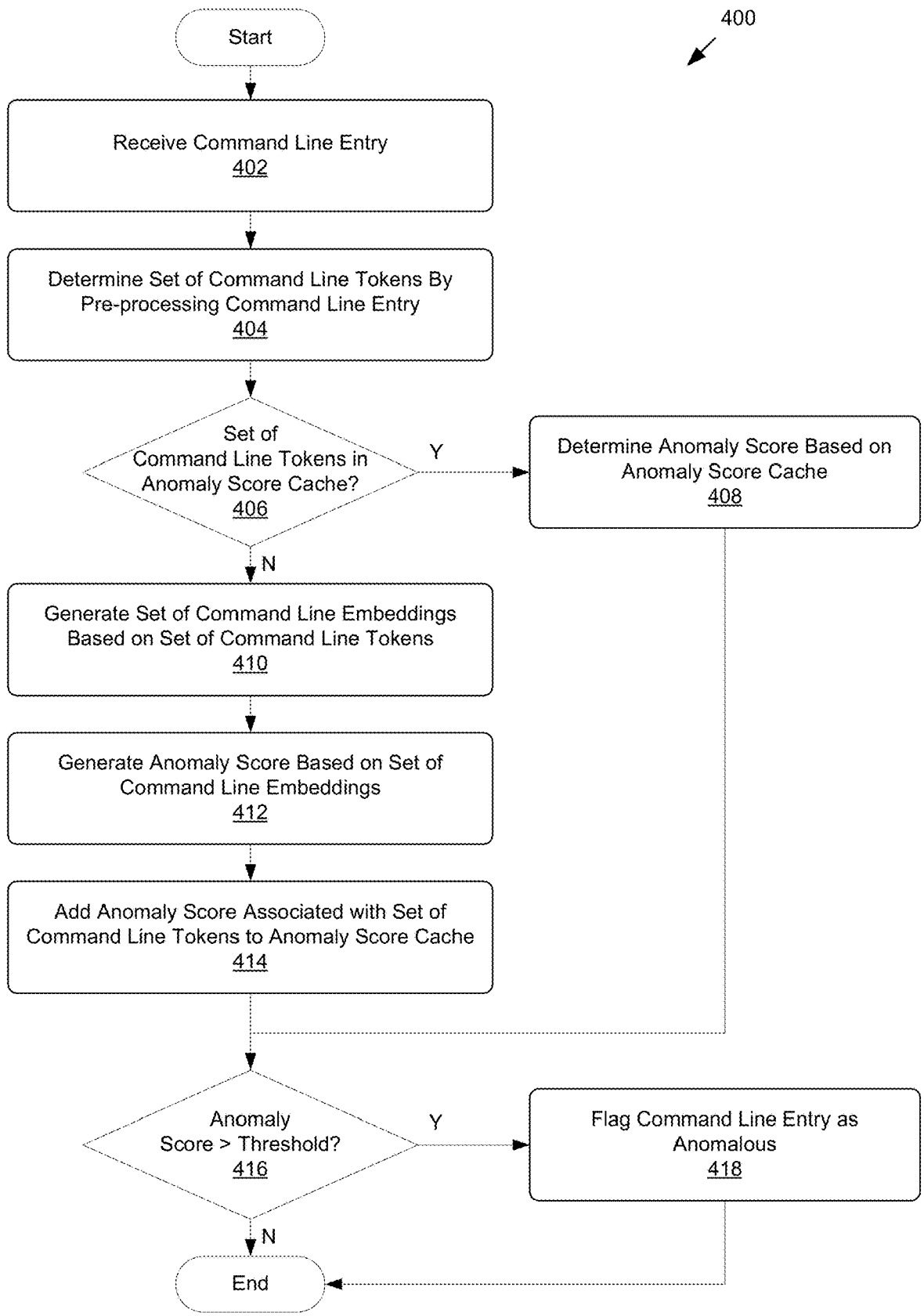
FIG. 4 shows a flowchart of an example process for processing a command line entry with the command line anomaly detection system.

FIG. 4 shows a flowchart of an example process 400 for processing a command line entry with the command line anomaly detection system 102. The example process 400 shown in FIG. 4 may be performed by a computing system, such as the computing system shown and described with respect to FIG. 5, configured to execute an instance of the command line anomaly detection system 102.

At block 402, the computing system can receive a command line entry. In some examples, the command line entry can be received from a sensor executing locally on a separate computing device. For example, the sensor can detect and/or capture the command line entry input at the separate computing device, and transmit a copy of the command line entry to the computing system that executes the command line anomaly detection system 102. In other examples, sensors executing locally on computing devices can send command line entries 104 to a central repository, such as a repository of command line entries 104 and/or other event data maintained by a digital security network, and at block 402 the computing system can receive a command line entry from the central repository.

At block 404, the computing system can pre-process the command line entry to determine a set of command line tokens 114 that correspond with the command line entry. For example, the pre-processor 108 of the command line anomaly detection system 102 can identify individual components, such as substrings, of the command line entry. The pre-processor 108 can also identify any types of variable substrings in the command line entry, and replace values of the variable substrings with replacement substrings. The pre-processor 108 can determine command line tokens 114 that correspond with values of the individual components of the command line entry, such as original substrings or replacement substrings. In some examples, the pre-processor 108 can use the token vocabulary 122 to identify individual components of the command line entry and/or to determine values of the corresponding command line tokens 114.

At block 406, the computing system can determine whether the set of command line tokens 114 determined at block 404 is in the anomaly score cache 120. As described above, when the command line anomaly detection system 102 determines an anomaly score associated with a set of set of command line tokens 114, the anomaly score can be added to the anomaly score cache 120 in association with the set of command line tokens 114. If the set of command line tokens 114 determined at block 404 is in the anomaly score cache 120 (Block 406—Yes), the computing system can use the anomaly score cache 120 to determine the anomaly score associated with the set of command line tokens 114. Accordingly, if the computing system has previously determined an anomaly score associated with a previously-received copy of the command line entry received at block 402, the computing system can use a cached anomaly score as the anomaly score for the command line entry received at block 402. By using the cached anomaly score, the computing system can avoid using the transformer model 110 and the anomaly detection model 112 to further process data associated with the command line entry received at block 402.

However, if the set of command line tokens 114 determined at block 404 is not in the anomaly score cache 120 (Block 406—No), at block 410 the computing system can generate a set of command line embeddings 116 based on the set of command line tokens 114. For example, the computing system can use the transformer model 110, such as a BERT model, to generate command line embeddings 116 that correspond to each of the command line tokens 114. The command line embeddings 116 can indicate semantic and/or contextual meaning of the corresponding command line tokens 114 (which represent components of the command line entry as described above). For example, although a substring represented by the same command line token may appear in different command line entries 104, variations in the position of the substring, and/or the presence of the substring in combination with earlier and/or later substrings, can change the meaning of that substring within the different command line entries 104. Accordingly, the transformer model 110 can determine command line embeddings 116 that indicate meanings of the components represented by the command line tokens 114, based at least in part on how the components relate to other components of the command line entry. As described above, the transformer model 110 can have been trained, via an unsupervised machine learning approach, to determine such meanings of components based on the transformer training data 124. Based on such training, the transformer model 110 can determine meanings of the command line tokens 114 that represent components of the command line entry at block 410.

At block 412, the computing system can use the set of command line embeddings 116 generated at block 410 to generate an anomaly score associated with the command line entry received at block 402. As discussed above, the anomaly detection model 112 can be based on one or more types of machine learning models, such as a PCA model, a COPOD model, an iForest model, an AutoEncoder model, or other models, or an ensemble of the PCA model, COPOD model, iForest model, AutoEncoder model, and/or other models. As described above, the anomaly detection model 112 can have been trained, via an unsupervised machine learning approach, to determine which sets of command line embeddings 116 are outliers relative to other sets of command line embeddings 116. Based on such training, the anomaly detection model 112 can determine an anomaly score indicating how much of an outlier the set of command line embeddings 116 associated with the command line entry is, relative to other sets of command line embeddings 116 associated with other command line entries 104.

At block 414, the computing system can add the anomaly score generated at block 412 to the anomaly score cache 120, in association with the set of command line tokens 114 determined at block 404. Accordingly, if the same set of command line tokens 114 are determined for a subsequent command line entry, the anomaly score for the subsequent command line entry can be determined based on the anomaly score cache 120, for instance at block 408.

At block 416, the computing system can determine whether the anomaly score generated at block 412 is above a threshold. In some examples, the threshold can be one or more defined values, such that the anomaly score can be above the threshold if one or more values associated with the anomaly score exceed the one or more defined values of the threshold. In other examples, the threshold can be set based on a number or percentage of an overall amount of command line entries 104 processed by the command line anomaly detection system 102 during a day, week, or other period of time. As an example, if the command line anomaly detection system 102 processes thousands of command line entries 104 per day, the threshold may be set based on the highest 1% of anomaly scores 106 associated with those thousands of command line entries 104, the highest two hundred and fifty anomaly scores 106 associated with those thousands of command line entries 104, or any other number or percentage. Accordingly, at block 416, the computing system can determine whether the anomaly score generated at block 412 is one of the highest anomaly scores 106 associated with a set of command line entries 104 that have been processed by the command line anomaly detection system 102, based on a threshold percentage or threshold number.

If the anomaly score generated at block 412 is above the threshold (Block 416—Yes), the computing system can flag the command line entry received at block 402 as anomalous or potentially anomalous. If the anomaly score generated at block 412 is instead equal to or less than the threshold (Block 416—No), the computing system may not flag the command line entry as anomalous or potentially anomalous, may flag the command line entry as non-anomalous, or may take no further action regarding the command line entry.

Flagging the command line entry as anomalous or potentially anomalous can lead to additional actions. As an example, an analyst may review the flagged command line entry to confirm whether the command line entry should be considered to be anomalous, determine a reason why the command line entry is anomalous, and/or otherwise investigate the flagged command line entry.

As another example, the analyst, the computing system, or another computing system can send a customer, associated with a computing device at which the flagged command line entry originated, a notification indicating that the command line entry has been flagged as anomalous or potentially anomalous. For instance, if an analyst has determined that the command line entry was anomalous due to indications in the command line entry indicating an outdated version of a software application, the analyst can send the customer a notification that indicates that the customer is using the outdated version of the software application and/or that suggests that the customer upgrade to a current version of the software application.

As yet another example, by flagging the command line entry as anomalous at block 418, and/or flagging other command line entries 104 as anomalous or non-anomalous, data indicating whether command line entries 104 have been flagged as anomalous or non-anomalous can be used as labeled training data. Such labeled training data can be used, via supervised machine learning, to train a separate machine learning system to predict whether command line entries 104 are anomalous.

The computing system can use the process 400 shown in FIG. 4 to process individual command line entries 104. For example, the computing system can execute instances of process 400 in sequence and/or in parallel to process different command line entries 104.

Figure 5:
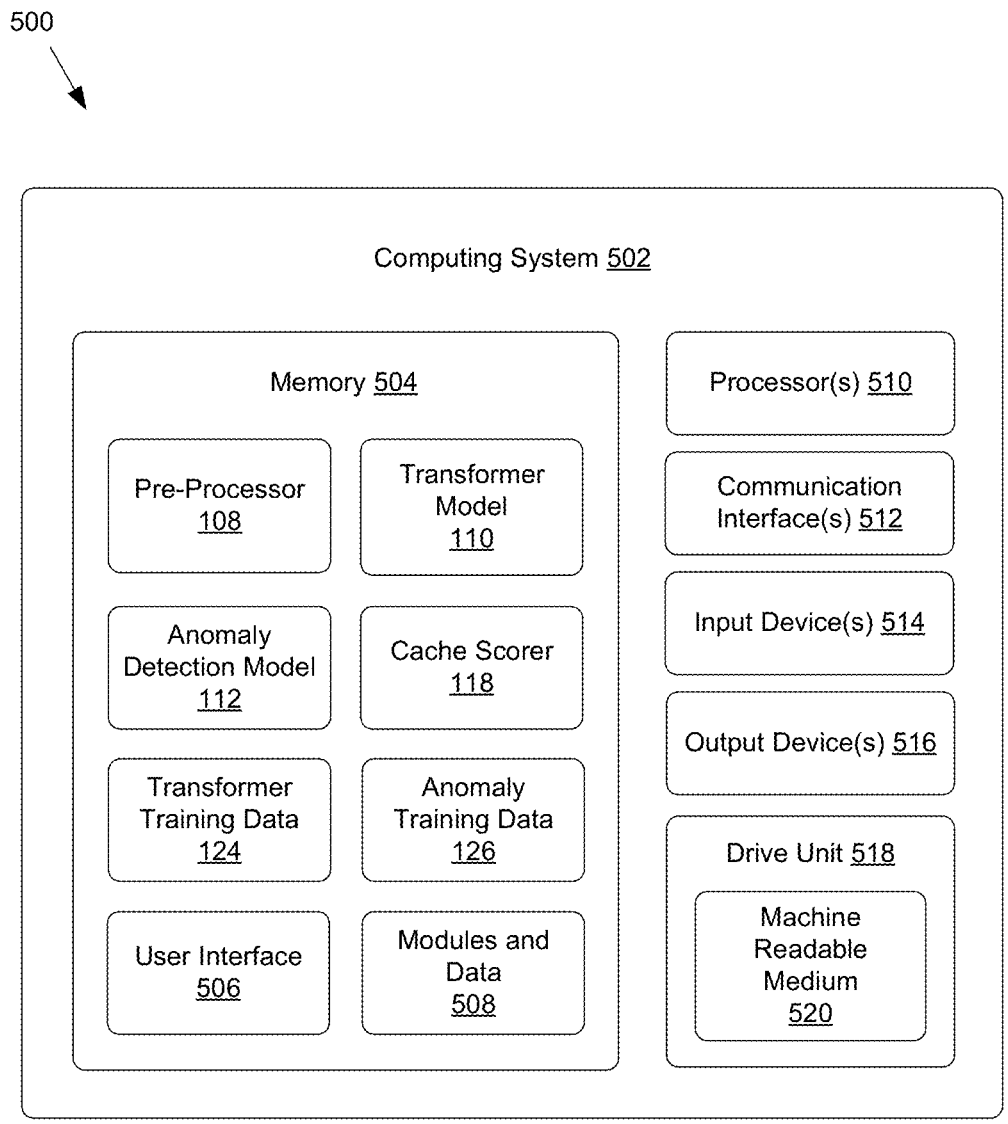
FIG. 5 shows an example system architecture for a computing system associated with the command line anomaly detection system.

FIG. 5 shows an example system architecture 500 for a computing system 502 associated with the command line anomaly detection system 102 described herein. The computing system 502 can include one or more servers, computers, or other types of computing devices that can execute one or more elements of the command line anomaly detection system 102. In some examples, the computing system 502 can be configured to train elements of the command line anomaly detection system 102, such as the transformer model 110 and/or the anomaly detection model 112. In other examples, the computing system 502 can execute an instance of the command line anomaly detection system 102 that includes versions of the transformer model 110 and the anomaly detection model 112 that have already been trained via a different computing system. In some examples, elements of the command line anomaly detection system 102 can be distributed among multiple computing systems. For instance, a first computing system may execute the pre-processor 108 and/or the transformer model 110, while a second computing system executes the anomaly detection model 112.

The computing system 502 can include memory 504. In various examples, the memory 504 can include system memory, which may be volatile (such as RAM), non-volatile (such as ROM, flash memory, non-volatile memory express (NVMe), etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 502. Any such non-transitory computer-readable media may be part of the computing system 502.

The memory 504 can store data associated with the command line anomaly detection system 102, such as the pre-processor 108, the transformer model 110, the anomaly detection model 112, the cache scorer 118, the transformer training data 124, the anomaly training data 126, a user interface 506 associated with the command line anomaly detection system 102, and/or any other data associated with the command line anomaly detection system 102. The user interface 506 can, for example, be configured to display the command line entries 104, the anomaly scores 106, the visualizations 200, and/or any other data processed, generated, and/or output by the command line anomaly detection system 102. The memory 504 can also store other modules and data 508. The modules and data 508 can include any other modules and/or data that can be utilized by the computing system 502 to perform or enable performing the actions described herein. Such modules and data 508 can include a platform, operating system, and applications, and data utilized by the platform, operating system, and applications.

The computing system 502 can also have one or more processors 510. In various examples, each of the processors 510 can be a central processing unit (CPU), a graphics processing unit (GPU), both a CPU and a GPU, or any other type of processing unit. Each of the one or more processors 510 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 510 may also be responsible for executing computer applications stored in the memory 504, which can be associated with types of volatile and/or nonvolatile memory. For example, the processors 510 can access data and computer-executable instructions stored in the memory 504, and execute such computer-executable instructions.

The computing system 502 can also have one or more communication interfaces 512. The communication interfaces 512 can include transceivers, modems, interfaces, antennas, telephone connections, and/or other components that can transmit and/or receive data over networks, telephone lines, or other wired or wireless connections. For example, the communication interfaces 512 can include one or more network cards or other network interfaces that can be used to receive command line entries 104 from other computing elements, and/or to transmit the anomaly scores 106 to other computing elements.

In some examples, the computing system 502 can also have one or more input devices 514, such as a keyboard, a mouse, a touch-sensitive display, voice input device, etc. The computing system 502 can also have one or more output devices 516 such as a display, speakers, a printer, etc.

The computing system 502 may also include a drive unit 518 including a machine readable medium 520. The machine readable medium 520 can store one or more sets of instructions, such as software or firmware, that embodies any one or more of the methodologies or functions described herein. The instructions can also reside, completely or at least partially, within the memory 504, processor(s) 510, and/or communication interface(s) 512 during execution thereof by the computing system 502. The memory 504 and the processor(s) 510 also can constitute machine readable media 520.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
    receiving, by one or more processors, a command line entry comprising a string of characters;
    determining, by the one or more processors, a set of command line tokens comprising numerical representations of one or more components of the command line entry;
    generating, by the one or more processors, using a transformer model comprising a first machine learning model, and based on the set of command line tokens comprising the numerical representations of the one or more components of the set of command line entry tokens, a set of command line embeddings, wherein:
    the set of command line embeddings comprises vectors indicating contextual meanings of the one or more components of the command line entry based at least in part on one or more of a presence, combination, or order of the one or more components of the command line entry relative to one or more other components of the command line entry; and
    generating, by the one or more processors, using an anomaly detection model comprising one or more second machine learning models different from the first machine learning model, and based on the set of command line embeddings generated by the transformer model, an anomaly score,
    wherein the anomaly score indicates whether the command line entry is an outlier relative to a set of other command line entries different from the command line entry.

2. The computer-implemented method of claim 1, wherein determining the set of command line tokens comprises:
    identifying, by the one or more processors, the one or more components of the command line entry; and
    determining, by the one or more processors, the numerical representations of individual command line tokens that correspond with individual components of the command line entry.

3. The computer-implemented method of claim 2, wherein the one or more components are identified at least in part based on a token vocabulary.

4. The computer-implemented method of claim 2, wherein:
    the one or more components are substrings of the string,
    the one or more components are identified at least in part by identifying a type of variable substring within the string,
    the one or more processors replace the variable substring with a corresponding replacement substring, and
    the one or more processors determine a numerical representation associated with the variable substring based on a predefined numerical value associated with the corresponding replacement substring.

5. The computer-implemented method of claim 1, wherein the first machine learning model of the transformer model is trained, via unsupervised machine learning, to determine the contextual meanings based on transformer training data comprising sample command line tokens associated with sample command line entries.

6. The computer-implemented method of claim 5, wherein the transformer model is a Bidirectional Encoder Representation from Transformers (BERT) model.

7. The computer-implemented method of claim 1, wherein the one or more second machine learning models of the anomaly detection model are trained, via unsupervised machine learning, to determine anomaly scores based on anomaly training data comprising sample command line embeddings generated by the transformer model in association with sample command line entries.

8. The computer-implemented method of claim 1, further comprising:
determining, by the one or more processors, that the anomaly score is above a threshold value; and
flagging, by the one or more processors, the command line entry as anomalous based on determining that the anomaly score is above the threshold value.

9. The computer-implemented method of claim 1, further comprising adding, by the one or more processors, the anomaly score to an anomaly score cache in association with the set of command line tokens.

10. The computer-implemented method of claim 9, further comprising:
receiving, by the one or more processors, a second command line entry; determining, by the one or more processors, that the set of command line tokens represents one or more second components of the second command line entry; and
determining, by the one or more processors, the anomaly score associated with the second command line entry by retrieving the anomaly score associated with the set of command line tokens from the anomaly score cache.

11. A computing system, comprising:
one or more processors; and
memory storing computer-executable instructions that, when executed by the one or more processors, cause the one or more processors to perform operations comprising:
receiving a command line entry comprising a string of characters;
determining a set of command line tokens comprising numerical representations of one or more components of the command line entry;
generating, using a transformer model comprising a first machine learning model, and based on the set of command line tokens comprising the numerical representations of the one or more components of the set of command line entry tokens, a set of command line embeddings, wherein:
the set of command line embeddings comprises vectors indicating contextual meanings of the one or more components of the command line entry based at least in part on one or more of a presence, combination, or order of the one or more components of the command line entry relative to one or more other components of the command line entry; and
generating, using an anomaly detection model comprising one or more second machine learning models different from the first machine learning model, and based on the set of command line embeddings generated by the transformer model, an anomaly score,
wherein the anomaly score indicates whether the command line entry is an outlier relative to a set of other command line entries different from the command line entry.

12. The computing system of claim 11, wherein the first machine learning model of the transformer model is trained, via unsupervised machine learning, to determine the contextual meanings based on transformer training data comprising sample command line tokens associated with sample command line entries.

13. The computing system of claim 11, wherein the one or more second machine learning models of the anomaly detection model are trained, via unsupervised machine learning, to determine anomaly scores based on anomaly training data comprising sample command line embeddings generated by the transformer model in association with sample command line entries.

14. The computing system of claim 11, wherein the operations further comprise:
determining that the anomaly score is above a threshold value; and
flagging the command line entry as anomalous based on determining that the anomaly score is above the threshold value.

15. A command line anomaly detection system, executed via one or more processors using computer-executable instructions stored in memory, comprising:
a pre-processor configured to convert a command line entry into a set of command line tokens comprising numerical representations of one or more components of the command line entry;
a transformer model, comprising a first machine learning model, configured to generate, based on the set of command line tokens comprising the numerical representations of the one or more components of the set of command line entry tokens, a set of command line embeddings, wherein:
the set of command line embeddings comprises vectors indicating contextual meanings of the one or more components of the command line entry based at least in part on one or more of a presence, combination, or order of the one or more components of the command line entry relative to one or more other components of the command line entry; and
an anomaly detection model, comprising one or more second machine learning models different from the first machine learning model, configured to generate an anomaly score based on the set of command line embeddings generated by the transformer model,
wherein the anomaly score indicates whether the command line entry is an outlier relative to a set of other command line entries different from the command line entry.

16. The command line anomaly detection system of claim 15, wherein the command line entry is a string, the one or more components are substrings of the string, and the pre-processor is configured to identify the one or more components of the command line entry based on one or more of:
a set of delimiters, or
a token vocabulary of a set of common substrings identified in a sample set of command line entries.

17. The command line anomaly detection system of claim 16, wherein the token vocabulary defines the numerical representations associated with the substrings, and the set of command line tokens indicates the numerical representations based on the token vocabulary.

18. The command line anomaly detection system of claim 15, wherein the command line entry is a string, the one or more components are substrings of the string, and the pre-processor is configured to:
   identify a type of variable substring within the string;
   replace the variable substring with a corresponding replacement substring;
   determine a numerical representation associated with the variable substring based on a predefined numerical value associated with the corresponding replacement substring; and
   determine a command line token based on the numerical representation.

19. The command line anomaly detection system of claim 15, wherein the first machine learning model of the transformer model is trained, via unsupervised machine learning, to determine the contextual meanings based on transformer training data comprising sample command line tokens associated with sample command line entries.

20. The command line anomaly detection system of claim 15, wherein the one or more second machine learning models of the anomaly detection model are trained, via unsupervised machine learning, to determine anomaly scores based on anomaly training data comprising sample command line embeddings generated by the transformer model in association with sample command line entries.

* * * * *

UNITED STATES PATENT AND TRADEMARK OFFICE
CERTIFICATE OF CORRECTION

PATENT NO. : 12,499,217 B2  
APPLICATION NO. : 17/945625  
DATED : December 16, 2025  
INVENTOR(S) : Stefan-Bogdan Cocea et al.

Page 1 of 1

It is certified that error appears in the above-identified patent and that said Letters Patent is hereby corrected as shown below:

On the Title Page

Item (72), change the name of the 2nd inventor from "Mihaela Petruta Garan" to --Mihaela Petruta Gaman--

Signed and Sealed this
Tenth Day of February, 2026

John A. Squires
*Director of the United States Patent and Trademark Office*